L. E. WATERMAN.
PLOW.
APPLICATION FILED MAY 27, 1912.
1,129,926.
Patented Mar. 2, 1915.
3 SHEETS—SHEET 3.
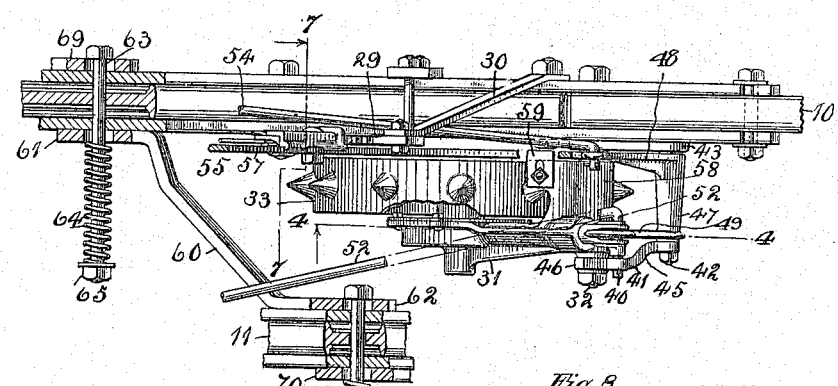
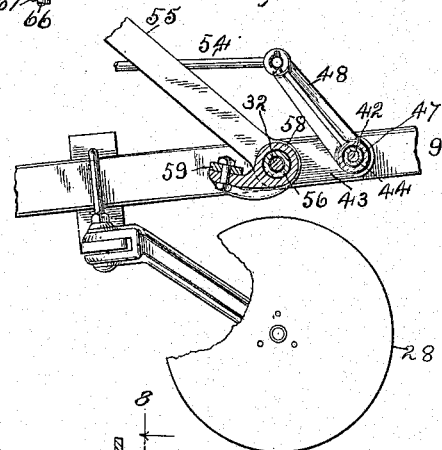
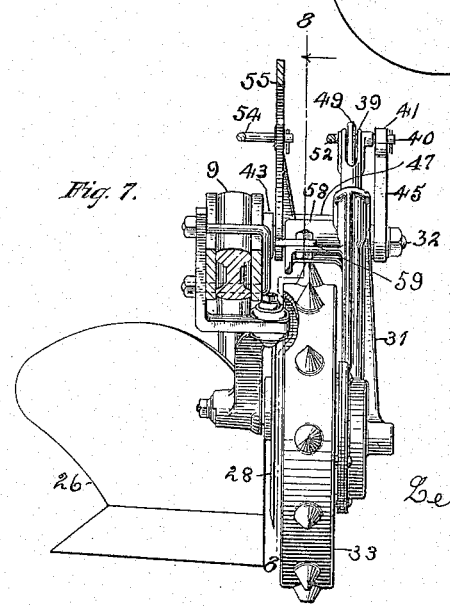

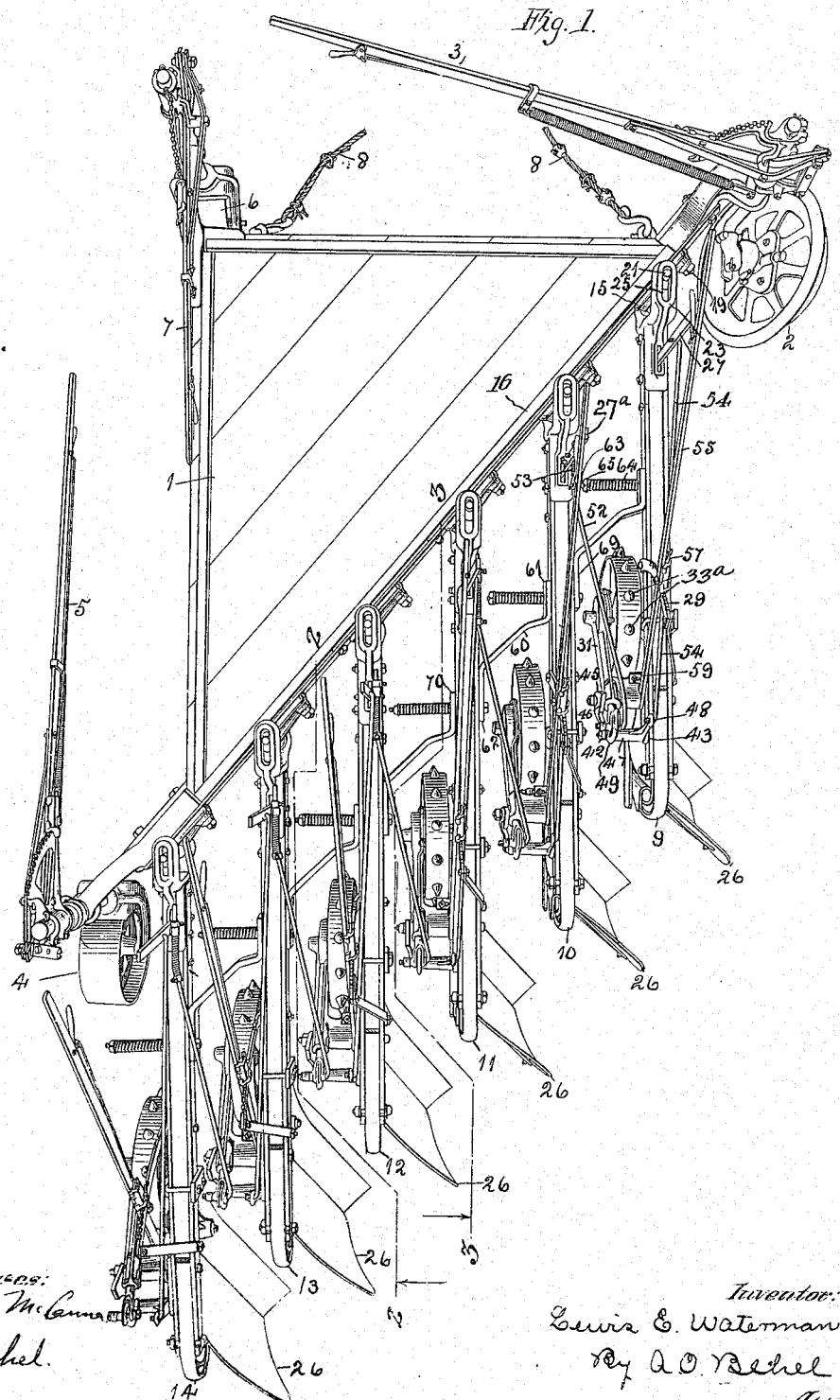

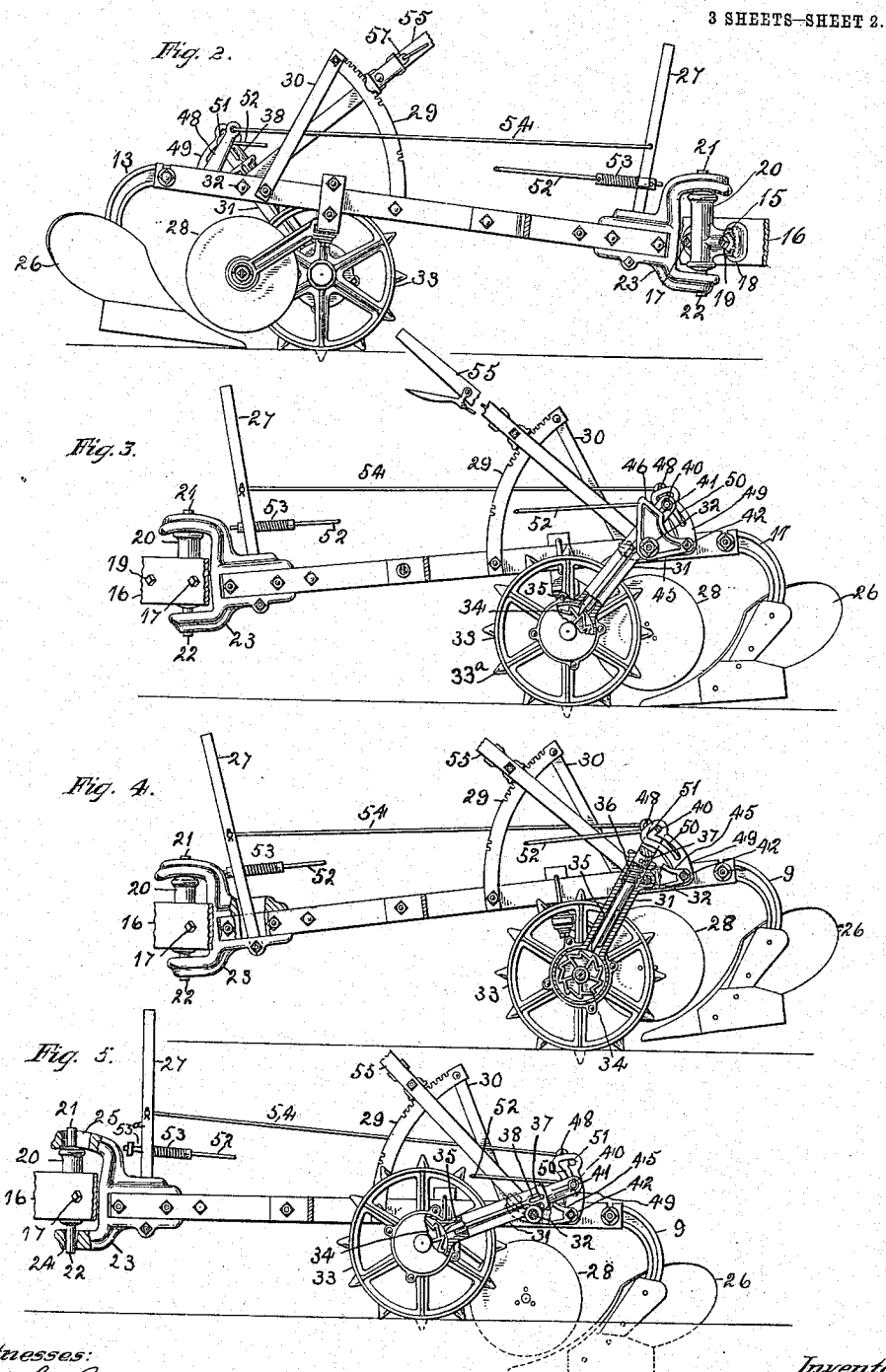

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLOW.

1,129,926.  Specification of Letters Patent.  Patented Mar. 2, 1915.

Application filed May 27, 1912. Serial No. 700,042.

*To all whom it may concern:*

Be it known that I, LEWIS E. WATERMAN, a citizen of the United States, residing at Rockford, in the county of Winnebago and State of Illinois, have invented certain new and useful Improvements in Plows, of which the following is a specification.

The principal object of this invention is to automatically raise and lower a plurality of plows in succession in order that when the plowing is finished all of the plows will be raised in a straight line transverse to the length of the furrows, and again resuming plowing, the plows will be dropped in the straight line as the plow advances.

In the accompanying drawings, Figure 1 is a plan view of the complete plow. Fig. 2 is a section on line 2—2 Fig. 1. Fig. 3 is a section on line 3—3 Fig. 1. Fig. 4 is a section on line 4—4 Fig. 6, in which the plow is elevated. Fig. 5 is an elevation partly in section of one of the plows in its working position. Fig. 6 is a partial plan and horizontal section of one of the plow beams and the plow connections therewith. Fig. 7 is a section on line 7—7 Fig. 6. Fig. 8 is a section on line 8—8 Fig. 7.

The frame supporting the plurality of plows comprises the platform in the form of a triangle at one corner of which is located the furrow wheel 2 with its adjusting lever.

A land wheel 4 is supported at the rear corner of the platform and is provided with an adjusting lever 5. At the forward left-hand corner of the platform opposite the furrow wheel is located a land wheel 6 and which is provided with an adjusting lever 7. The cables 8 form the hitch connection with the platform.

As the construction of all of the plow beams, and the plows connected therewith is the same, a description of one will apply to all excepting that a different reference numeral will be applied to each beam.

The plow beams 9, 10, 11, 12 13 and 14 are connected to the brackets 15 secured to the rear diagonally arranged bar 16 of the main frame. The bracket 15 as shown at Fig. 2, has one end secured by the pivot bolt 17 and its other end is formed with a vertical slot 18 through which a bolt 19 passes, which allows of a tilting movement being imparted to the bracket. The bracket has a vertical enlargement 20 with reduced ends 21 and 22.

A yoke 23 is secured to the forward end of a beam and is provided with an opening 24 in its lower branch which receives the reduced end 22, and with a slot 25 in its upper branch which receives the reduced end 21. A plow 26 is connected to the beam 9. A lever 27 is pivotally supported by the bracket 23. A rolling colter 28 is connected to the plow beam.

To a plow beam is secured a toothed segment 29 which is braced by the bar 30. A wheel support 31 has a pivotal connection with a beam on the bolt 32, and a wheel 33 is pivotally connected to the support 31. The studs 33$^a$ on the periphery of the wheel 33 stop the wheel from skidding; as it will be noticed hereinafter, it is desired that the wheel should remain stationary at a certain time. The lower end of the support 31 is in the form of a recessed casing within which is located a ratchet wheel 34 which rotates with the wheel 33. The support 31 is tubular and within it is located a dog 35 capable of lengthwise movement into and out of engagement with the ratchet wheel 34. A coiled spring 36 surrounds the dog and exerts a force thereon to hold the dog free of the ratchet wheel. A pin 37 is supported by the dog and is movable in the slot 38 in the wheel support which will prevent rotation of the dog. The upper end of the dog is formed with a slot 39 Fig. 7, through which a pin 40 passes and supports a roller 41 on one projecting end thereof.

A bolt 42 passes through a plate 43. A sleeve 44 Fig. 8, is located on the bolt 42 and a bracket 45 is supported by the bolts 32 and 42 and rests against the sleeve 44. This bracket has a cam-face 46. Over the sleeve 44 is located a tubular section 47 from one end of which extends a vertical arm 48 having a perforated end, and from its other end extends an arm 49 formed with a cam-groove 50 having its upper end formed with an offset 51. The arm 49 is located in the slot 39 of the dog 35 and the pin 40 is located in the cam-groove 50. A rod 52 is a continuation of the pin 40 and is connected with the lever 27$^a$ of the next plow to the left through the spring 53. A rod 54 connects the arm 48 with the hand lever 27. A hand lever 55 is pivotally supported on a sleeve 56 Fig. 8, surrounding the bolt 32, and is provided with a dog 57 adapted to engage the toothed segment 29.

From the wheel support 31 extends an inward projection 58 which is supported by the sleeve 56 surrounding the bolt 32, and is provided with a ledge which supports a plate 59 Figs. 7 and 8, the plate being adjustable and adapted to be moved to an inoperative position.

The various beams 9, 10, 11, 12, 13 and 14 are connected by spring devices shown in detail at Fig. 6.

A brace 60 has one end 61 lying along side of the beam 10, and its other end 62 lying along side of the beam 11. A bolt 63 passes through the beam 10 and end 61 of the brace 60 and a spring 64 surrounds the projecting end of the bolt having one end resting against the end 61 and its other end resting against the nut 65 on the bolt. A bolt 66 passes through the beam 11 and end 62 of the brace 60 and a spring 67 surrounds the projecting end of the bolt having one end resting against the end 62 and its other end resting against the nut 68 on the bolt. As shown at Fig. 6, the bolt 63 also passes through the end 69 of a brace connecting the beam 10 with the beam 9, and the bolt 66 also passes through the end 70 of a brace connecting the beam 10 with the beam 11. By this spring connection between the beams of the plow, each beam can have a movement laterally in dodging stones and the like, and will be returned into working position by the springs.

The slotted yoke 23 will allow a vertical movement of a beam and the plow connected with it.

By means of lowering a hand lever 55, it will be brought in contact with plate 59 thereby rocking the support 31, and carrying the wheel 32 supported by it rearward, which will elevate the plow beam and the plow carried by it.

The working depth of the plow can be regulated by means of this hand lever and plate which will allow the plow beam to rise but will not allow it to drop a greater distance. This plate is made movable for the sole purpose of permitting the hand lever 55 to be folded alongside of the beam in order to make a close bundle.

When all of the beams are locked in their elevated positions, the pins 40 will be located in the recesses 51 of the cam-grooves 50 of the arms 49 as shown at Fig. 4. In lowering the beams and the plows connected therewith into working position, the object is to unlock the beams successively after the first beam 9 has been unlocked by the operator. The operator moves the lever 27 of the beam 9 rearward which will rock the arm 48 through the rod 54, and will also rock the arm 49 rearward sufficiently to liberate the pin 40 from the recess 51 at the upper end of the cam-groove 50. The wheel 33 of beam 9 will move forward its support 31 rocking on the bolt 32, and the pin 40 traveling down the cam-groove 50. In moving the arm 49 of the beam 9 rearward a pull will be exerted rearward on the lever 27ª of the beam 10 through the rod 52 and the nut at the end of said rod, and in moving this lever 27ª of beam 10 rearward the operations above described respecting beam 9 will be repeated, and so on until all the beams and plows have been lowered. In dropping beam 9 as stated above, the pin 40 will travel downward the cam-groove 50 by the wheel 33 being forward of the pivot bolt 32 of the wheel support 31 and the cam-groove being rear thereof. This pin 40 carried downward by the beam falling is also carried rearward because of said pivot 32 of the beam support 31, thus moving lever 27ª rearward through rod 52 which drops beam 10 as above described. When beam 10 drops, its pin 40 is similarly carried downward and in its downward movement moves the arm 49 rearward, thus moving lever 27ª rearward still farther than it is moved by rod 52 in order to leave a clearance 53ª at the front of rod 52, as shown in Fig. 5. This clearance 53ª is on rods 52 when the plows are down so that when raising any middle beam, the beam to the furrow side will not be raised also.

It will be seen that between the time of dropping beam 9 and the dropping of beam 10 the plow has advanced sufficiently to bring the plow of beam 10 in line with the starting position of plow of beam 9 and so on, so that all of the plows will drop into the ground on a line transverse to the line of draft.

In order to raise the plows, it is necessary that the plow of beam 9 be raised first, then plow of beam 10 after it has advanced in line with the position of plow of beam 9 at the time it was raised and so on with the other plows which, when they are all raised will leave a straight line transverse to the line of draft.

In raising the plows, the operator will move the lever 27 of beam 9 forward which will move the arm 48 forward and carry the arm 49 with it, which will force the dog 35 in engagement with the ratchet wheel 34 of the wheel 33 of beam 9.

As the wheel 33 is locked in connection with the support 31 pivoted to the beam 9 and as the beam is drawn forward, the wheel will stand still, which will elevate the beam in the position shown at Fig. 3, which is just before the roller 41 contacts with the incline face 46 of bracket 45. In the further raising movement of the beam, the roller 41 will move up the incline 46 and force the dog 35 free of the ratchet wheel 34, thereby liberating the wheel so it may freely rotate at the same time the spring 36 will continue the movement of the dog and force the pin 40 into the recess 51 of the cam-groove 50 thereby locking the beam 9 in its elevated position.

In raising the wheel support 31 from the position shown in Fig. 5 into the position shown in Fig. 4, the rod 52 will be moved forward which will move the lever 27 of the plow beam 10 forward, thereby starting the raising movement of beam 10, and the plow connected with it, and so on with the remainder of the plow beams and their plows.

The operator has only to move the lever 27 of beam 9 to the rear to start the automatic movements to drop all the beams, and by moving the same lever forward will start the automatic movements to raise all the beams.

I claim as my invention—

1. The combination of a frame, a plurality of plow beams connected therewith and capable of a vertical movement, supporting means for each plow beam, and independent automatic raising and lowering means connected to each beam, and adapted to raise or lower in succession the beams to the land side of the beam being so operated.

2. The combination of a frame, a plurality of plow beams connected therewith and capable of a vertical movement, supporting means for each plow beam, automatic raising and lowering means having connection with each beam, and means for operating said raising and lowering means, said last mentioned means being operated by any one of the plow beams and operating successively the beams to the land side thereof.

3. The combination of a frame, a plurality of plow beams connected therewith and capable of a vertical movement, a link connection between each of the plow beams, and its adjacent beam and a lever connected to each of said link connections, the operation of any lever automatically raising or lowering in succession the plow beams to the land side of said operated lever.

4. The combination of a frame, a plurality of plow beams connected therewith and capable of a vertical movement, means having connection with each beam and adapted to support the beam in a raised or lowered position, a link connection between each of said supporting means and its adjacent means, and a hand lever connected to each of said link connections, the operation of any one of said hand levers automatically raising or lowering in succession the plow beams to the land side of said operated lever.

5. The combination of a frame, a plurality of plow beams independently pivotally connected to the frame, a wheel for each beam, a support for each wheel pivoted to the beam, connections between the wheel supports of the different beams, and means for raising the beams in succession upon the mechanism of the beam next the furrow side being operated.

6. The combination of a frame, a plurality of plow beams connected therewith and capable of a vertical movement, a wheel for each beam, a support for each wheel pivoted to the beam, means having connection with each support for holding its beam raised or lowered, a connection between said means of each of the beams, and its adjacent beam and means for operating said connections whereby the operation of any one connection will automatically raise or lower in succession the beams to the land side thereof.

7. The combination of a frame, a plurality of plow beams connected therewith and capable of a vertical movement, a wheel for each beam, a support for each wheel pivoted to the beam, means having connection with each support for holding its beam either raised or lowered, a lever for each beam having a connection with the holding means of its beam, and a connection between each lever and the holding means of an adjacent beam, the actuation of any one lever automatically raising or lowering in succession the beams to the land side of said actuated lever.

8. The combination of a frame, a plurality of plow beams connected therewith and capable of a vertical movement, a wheel for each beam, a support for each wheel pivoted to the beam, means having a connection with each support for holding its beam raised or lowered, a lever for each beam having a connection with the holding means of its beam, and a connection between each lever and the support of the beam adjacent thereto, the actuation of any one lever automatically raising or lowering in succession the beams to the land side of said actuated lever.

9. The combination of a frame, a plurality of plow beams connected therewith and capable of vertical movement, raising and lowering means for the plows, and means whereby each plow, when raised or lowered, causes a similar movement of the plow next in succession to the landside.

10. The combination of a frame, a plurality of plow beams connected therewith and capable of vertical movement, raising or lowering means on each beam, and connections between the raising and lowering means whereby each of said means after its operation, causes the operation of the means on the beam next in succession to the land side.

11. The combination of a frame, a plurality of plow beams connected therewith and capable of vertical movement, raising and lowering means on each plow, and connections between the plows whereby each plow, when raised or lowered causes a similar movement of the plow next in succession to the land side.

12. A gang plow comprising a series of independent plows, means including a wheel for positioning the plows in lifted or lowered relation to the surface of the ground, means operated by said wheels for lifting the plows, and means operative through the consequent vertical motion of a preceding plow to cause the operation of the lifting means of the succeeding plow.

13. A gang plow comprising a plurality of plow members arranged in an oblique line, a plow wheel for holding each of said plows positioned relative to the surface of the ground, means operated by each of said plow wheels for lifting the plow, means under the control of the operator for setting in action said first plow lifting means, and means operative through the consequent vertical motion of each preceding plow to cause the operation of the lifting means of the succeeding plow so that the plows will come out of the ground in a line substantially at right angles to the line of movement thereof.

14. The combination of a frame, a plurality of plow beams connected thereto, and capable of a vertical movement, separate mechanisms for vertically moving said plows respectively, means for automatically operating any one of said mechanisms and those to the land side thereof, in succession.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."